(12) United States Patent  
Miyazawa

(10) Patent No.: US 7,872,216 B2  
(45) Date of Patent: Jan. 18, 2011

(54) PROJECTOR HAVING TWO IMAGE FORMATION UNITS FOR PROJECTING A LIGHT BEAM

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 12/121,313

(22) Filed: May 15, 2008

(65) Prior Publication Data

US 2009/0009724 A1    Jan. 8, 2009

(30) Foreign Application Priority Data

Jul. 2, 2007     (JP) .............................. 2007-173750

(51) Int. Cl.  
   *H01L 27/00*    (2006.01)

(52) U.S. Cl. ................................................. 250/208.1

(58) Field of Classification Search .............. 250/208.1, 250/225, 226, 216; 353/20, 31, 80; 349/8, 349/9

See application file for complete search history.

(56) References Cited

U.S. PATENT DOCUMENTS 6,142,634 A * 11/2000 Ogawa et al. .................. 353/38

FOREIGN PATENT DOCUMENTS

| JP | 01-126678 | 5/1989 |
| JP | 05-107639 | 4/1993 |
| JP | 2006-235158 | 9/2006 |

* cited by examiner

*Primary Examiner*—Que T Le  
(74) *Attorney, Agent, or Firm*—AdvantEdge Law Group, LLC

(57) ABSTRACT

A projector includes a first image formation unit including a first color separation system, first to third light modulation elements, and a first color combining system; a second image formation unit including a second color separation system, fourth to sixth light modulation elements, and a second color combining system; a polarization combining system that combines an image light beam outputted from the first image formation unit and an image light beam outputted from the second image formation unit; and a projection system that projects the image light beam that has been combined in the polarization combining system.

9 Claims, 10 Drawing Sheets

WHEN SLIGHTLY CONVERGENT
LIGHT IS INCIDENT

WHEN SLIGHTLY DIVERGENT
LIGHT IS INCIDENT

PROJECTOR HAVING TWO IMAGE FORMATION UNITS FOR PROJECTING A LIGHT BEAM

BACKGROUND

1. Technical Field

The present invention relates to a projector.

2. Related Art

A method has been known in which two projectors are used to project and overlay the same images on one screen (projection surface) (see JP-A-5-107639, for example). According to such a method, the brightness of the projected, overlaid image light is nearly doubled, and hence the image light projected onto the screen is very bright.

In such overlay projection, however, it is not easy to accurately superimpose the image light from the two projectors on the screen. Inaccurate superimposition of the image light from the two projectors degrades the image quality of the projected image.

As a projector of related art capable of solving such a problem, a projector has been proposed which includes a polarization separation system that separates the light from an illuminator into a light beam containing a first polarization component and a light beam containing a second polarization component and directs them toward two image formation units, and a polarization combining system that combines the image light beams from the two image formation units (see JP-A-1-126678, for example).

According to the projector of related art, the light from the illuminator is separated into the light beam having the first polarization component and the light beam having the second polarization component, and the image formation units form the image light beams. Then, the polarization combining system combines the two image light beams, and a projection system projects the combined light beam onto a screen. Therefore, the image light beams from the two image formation units can be accurately superimposed on the screen. As a result, it is possible to prevent degradation in image quality of the projected image.

However, an investigation conducted by the inventor has shown that even when a light homogenizing system, such as a lens integrator, is used to make the in-plane light intensity distribution of the light emitted from the illuminator uniform in the projector of related art, the image light projected onto the screen presents color shading in the right-left direction (horizontal direction). When the image light projected onto the screen presents color shading in the right-left direction (horizontal direction), the image quality of the projected image is degraded.

SUMMARY

An advantage of some aspects of the invention is to provide a projector that can prevent the generation of color shading in the light projected onto a projection surface and hence prevent the degradation in image quality of the projected image.

To achieve the above advantage, the inventor has thoroughly investigated the causes of the generation of the right-left (horizontal) color shading in the image light projected onto the screen in the projector of related art. As a result, the inventor has found that the causes associated with the optical system come from the following four factors combined in a complex manner: (1) A dichroic mirror is disposed in such a way that it is inclined to the system optical axis by 45 degrees, (2) The light incident on the dichroic mirror is not precisely collimated, (3) The spectral characteristics of the dichroic mirror change with the angle of incidence of the light, and (4) Considering the two image light beams having the same color outputted from the two image formation units, the color light beam reflected off or passing through the front area of a first dichroic mirror and the color light beam reflected off or passing through the front area of a third dichroic mirror are projected on one side in the right-left direction on the projection surface, whereas the color light beam reflected off or passing through the rear area of the first dichroic mirror and the color light beam reflected off or passing through the rear area of the third dichroic mirror are projected on the other side in the right-left direction on the projection surface. These four factors will be described below in detail with reference to FIGS. 8 to 11.

FIG. 8 diagrammatically shows the optical system of a projector 900 of related art.

FIGS. 9A and 9B explain one of the problems of the projector 900 of related art. FIG. 9A diagrammatically shows the angle of slightly convergent light incident on a first dichroic mirror 932, and FIG. 9B diagrammatically shows the angle of slightly divergent light incident on the first dichroic mirror 932.

FIG. 10 explains the spectral characteristics of the first dichroic mirror 932.

FIG. 11 diagrammatically shows the light path of the light traveling in the projector 900 of related art. In FIG. 11, the light path of the light traveling along the system optical axis of the first dichroic mirror 932 and incident on the front area thereof is indicated by the open circles. The light path of the light traveling along the system optical axis of the first dichroic mirror 932 and incident on the rear area thereof is indicated by the filled circles. The light path of the light traveling along the system optical axis of a third dichroic mirror 962 and incident on the front area thereof is indicated by the open triangles. The light path of the light traveling along the system optical axis of the third dichroic mirror 962 and incident on the rear area thereof is indicated by the filled triangles.

For clarity, FIG. 11 does not show part of the optical elements in an illuminator 910, light modulation elements 940R to 940B and 970R to 970B, and a projection system 992 shown in FIG. 8.

The projector 900 of related art, which will be described below, differs from the projector described in JP-A-1-126678 in that the colors of the light beams reflected off or passing through the first to fourth dichroic mirrors are different and that a cross dichroic prism is used as the color combining system instead of a cross dichroic mirror. Except the above points, the projector 900 of related art is configured in the same manner as the projector described in JP-A-1-126678, so that there should be no problem in describing the above-mentioned four factors.

The projector 900 of related art includes, as shown in FIG. 8, an illuminator 910, a polarization separation mirror 912 as a polarization separation system, two image formation units 920 and 950, a polarization combining prism 990 as a polarization combining system, and a projection system 992.

The image formation unit 920 includes a color separation system 930, a relay system 936, light modulation elements 940R, 940G, and 940B, and a cross dichroic prism 942. The color separation system 930 includes the first dichroic mirror 932 and a second dichroic mirror 934.

The image formation unit 950 includes a color separation system 960, a relay system 966, light modulation elements 970R, 970G, and 970B, and a cross dichroic prism 972. The color separation system 960 includes the third dichroic mirror 962 and a fourth dichroic mirror 964.

The first dichroic mirror 932 and the third dichroic mirror 962 serve to reflect red light and transmit other color light (blue light and green light), and the second dichroic mirror 934 and the fourth dichroic mirror 964 serve to reflect green light and transmit blue light. Each of the dichroic mirrors 932, 934, 962, and 964 is inclined to the system optical axis by 45 degrees.

In the projector 900 of related art, even when a light homogenizing system is used to make the in-plane light intensity distribution of the light emitted from the illuminator, the light from the illuminator 910 cannot be precisely collimated. Therefore, the light incident on each of the dichroic mirrors 932, 934, 962, and 964 is not precisely collimated but slightly convergent or slightly divergent.

For example, when slightly convergent light is incident on the first dichroic mirror 932, as shown in FIG. 9A, the light incident on the front half of the first dichroic mirror 932 along the system optical axis (the area closer to the illuminator 910) (hereinafter also simply referred to as "front area") is incident at a shallow angle with respect to the mirror surface of the first dichroic mirror 932, whereas the light incident on the rear half of the dichroic mirror 932 along the system optical axis (the area farther away from the illuminator 910) (hereinafter also simply referred to as "rear area") is incident at a steep angle with respect to the mirror surface of the first dichroic mirror 932.

When slightly divergent light is incident on the first dichroic mirror 932, as shown in FIG. 9B, the light incident on the front area of the first dichroic mirror 932 is incident at a steep angle with respect to the mirror surface of the first dichroic mirror 932, whereas the light incident on the rear area of the first dichroic mirror 932 is incident at a shallow angle with respect to the mirror surface of the first dichroic mirror 932.

As described above, the angle of the light incident on the front area of the first dichroic mirror 932 differs from the angle of the light incident on the rear area, and the spectral characteristics of the first dichroic mirror 932 change with the angle of incidence of the light as shown in FIG. 10. Therefore, the amount of red light reflected off the front area of the first dichroic mirror 932 differs from the amount of red light reflected off the rear area.

While the description has been made with reference to the first dichroic mirror 932, the same argument applies to the other dichroic mirrors 934, 962, and 964.

In the layout of the optical elements that form the projector 900 shown in FIG. 8, the combined light outputted from the polarization combining prism 990 is produced, as shown in FIG. 11, in such a way that the light reflected off or passing through the front area of the first dichroic mirror 932 (see the light path indicated by the open circles) is superimposed with the light reflected off or passing through the front area of the third dichroic mirror 962 (see the light path indicated by the open triangles), and the light reflected off or passing through the rear area of the first dichroic mirror 932 (see the light path indicated by the filled circles) is superimposed with the light reflected off or passing through the rear area of the third dichroic mirror 962 (see the light path indicated by the filled triangles).

Therefore, the difference in the amount of light (unevenness in the amount of light) generated between the red light reflected off the front area of the first dichroic mirror 932 and the red light reflected off the rear area is added to the difference in the amount of light (unevenness in the amount of light) generated between the red light reflected off the front area of the third dichroic mirror 962 and the red light reflected off the rear area. Therefore, among the image light projected onto the screen, the red light presents unevenness in the amount of light in the right-left direction (horizontal direction).

The same argument applies to the green light and the blue light. Therefore, among the image light projected onto the screen, the green light and the blue light also present unevenness in the amount of light in the right-left direction (horizontal direction). As a result, the image light projected onto the screen presents unevenness in the amount of light in the right-left direction (horizontal direction).

As described above, in the projector of related art, the factors (1) to (3) described above cause the difference in the amount of light between the light reflected off or passing through the front area of each of the dichroic mirrors and the light reflected off or passing through the rear area. When these factors are combined with the factor (4) described above, the image light projected onto the screen presents unevenness in the amount of light in the right-left direction (horizontal direction).

Further, in the projector of related art, a liquid crystal panel that modulates polarized light is used as the light modulation element. When the polarized light from the illuminator that is not precisely collimated is incident on the liquid crystal panel, the image light projected on the screen tends to present even greater unevenness in the amount of light in the right-left direction (horizontal direction).

The inventor has conducted further investigation based on the findings described above and realized that the right-left unevenness in the amount of image light projected onto the projection surface can be prevented by projecting the image light beams corresponding to the same color light beams outputted from the two image formation units 920 and 950 are reversed from each other in the right-left direction on the projection surface, and also realized that the unevenness in the amount of image light projected onto the projection surface in the right-left direction can be reduced by, for each of at least two color light beams among the first to third color light beams, projecting the image light beams corresponding to the same color light beams in such a way that the image light beams are reversed in the right-left direction on the projection surface.

That is, (1) a projector according to an aspect of the invention includes a first image formation unit including a first color separation system having a first dichroic mirror that separates the light containing first to third color light components from an illuminator into a light beam containing one of the three color light components and a light beam containing the other two color light components and a second dichroic mirror that separates the light beam that has been separated by the first dichroic mirror and contains the other two color light components, first to third light modulation elements that modulate the first to third color light beams that have been separated by the first color separation system, and a first color combining system that combines image light beams corresponding to the first to third color light beams that have been modulated by the first to third light modulation elements; a second image formation unit including a second color separation system having a third dichroic mirror that separates the light containing the first to third color light components from the illuminator into a light beam containing one of the three color light components and a light beam containing the other two color light components and a fourth dichroic mirror that separates the light beam that has been separated by the third dichroic mirror and contains the other two color light components, fourth to sixth light modulation elements that modulate the first to third color light beams that have been separated by the second color separation system, and a second color combining system that combines image light beams corresponding to the first to third color light beams that have been modulated by the fourth to sixth light modulation elements; a polarization combining system that combines the image light beam outputted from the first image formation unit and the image light beam outputted from the second image formation unit; and a projection system that projects the image light beam that has been combined in the polarization combining system. For each of two color light beams among the first to third color light beams, the image light beams corresponding to the same color light beams outputted from the first and second image formation units are projected in such a way that the image light beams are reversed from each other in the right-left direction on a projection surface.

In the projector of the invention, for each of two color light beams among the first to third color light beams, the image light beams corresponding to the same color light beams outputted from the first and second image formation units are projected in such a way that the image light beams are reversed from each other in the right-left direction on the projection surface. For example, provided that the first to third colors are red, green, and blue, respectively, for each of two color light beams among the red, green, and blue color light beams, the image light beams corresponding to the same color light beams outputted from the first and second image formation units are projected in such a way that the image light beams are reversed from each other in the right-left direction on the projection surface. In this way, among the red, green, and blue color light beams, the two color light beams will not present unevenness in the amount of light in the right-left direction (horizontal direction).

By thus preventing the generation of unevenness in the amount of light for two color light beams among the first to third color light beams, the unevenness in the amount of light on the screen is improved as compared to that in the projector of related art (see FIG. 8). As a result, it is possible to prevent degradation in image quality of the projected image.

In this text, "the right-left direction (horizontal direction) on the projection surface" refers to, "among the directions parallel to the projection surface, the direction parallel to the plane in which the optical elements in the projector are disposed." In other words, where the first to fourth dichroic mirrors among the optical elements in the projector are concerned, "the right-left direction (horizontal direction) on the projection surface" refers to "among the directions parallel to the projection surface, the direction parallel to the plane perpendicular to the mirror surfaces of the first to fourth dichroic mirrors."

(2) In the projector according to (1), it is preferable that the first and second dichroic mirrors are configured in such a way that the first dichroic mirror separates the first color light from the second and third color light and the second dichroic mirror separates the second color light from the third color light, and the third and fourth dichroic mirrors are configured in such a way that the third dichroic mirror separates the third color light from the first and second color light and the fourth dichroic mirror separates the first color light from the second color light.

The projector according to (1) is achieved by configuring the first to fourth dichroic mirrors to function as described above.

(3) In the projector according to (2), it is preferable that the first and second dichroic mirrors are configured in such away that the first dichroic mirror reflects the first color light and transmits the second and third color light and the second dichroic mirror reflects the second color light and transmits the third color light, and the third and fourth dichroic mirrors are configured in such a way that the third dichroic mirror reflects the third color light and transmits the first and second color light and the fourth dichroic mirror reflects the second color light and transmits the first color light. At the same time, the first color light beam traveling along the illumination optical axis in the first dichroic mirror and reflected off the front area thereof and the first color light beam traveling along the illumination optical axis in the fourth dichroic mirror and passing through the front area thereof are projected in such a way that these first color light beams are reversed from each other in the right-left direction on the projection surface, and the third color light beam traveling along the illumination optical axis in the second dichroic mirror and passing through the front area thereof and the third color light beam traveling along the illumination optical axis in the third dichroic mirror and reflected off the front area thereof are projected in such a way that these third color light beams are reversed from each other in the right-left direction on the projection surface.

That is, for each of the first and third color light beams among the first to third color light beams, the image light beams corresponding to the same color light beams are projected in such a way that the image light beams are reversed from each other in the right-left direction on the projection surface. By employing such a configuration, provided that, for example, the first color is red and the third color is blue, for the red and blue color light beams, it is possible to prevent the generation of unevenness in the amount of light in the right-left direction (horizontal direction) on the projection surface. By thus preventing the generation of unevenness in the amount of light in the right-left direction (horizontal direction) on the projection surface, for example, for the two red and blue color light beams among the three red, green, and blue color light beams, the unevenness in the amount of light on the screen is improved as compared to that in the projector of related art (see FIG. 8). As a result, it is possible to prevent degradation in image quality of the projected image.

In this text, "the front area along the illumination optical axis in the first dichroic mirror (second to fourth dichroic mirrors)" refers to the area of the first dichroic mirror (second to fourth dichroic mirrors) that receives light and is closer to the illuminator, and "the rear area along the illumination optical axis in the first dichroic mirror (second to fourth dichroic mirrors)" refers to the area of the first dichroic mirror (second to fourth dichroic mirrors) that receives light and is farther away from the illuminator.

(4) In the projector according to (3), it is preferable that the projector further includes a relay system disposed between the second dichroic mirror and the third light modulation element that modulates the third color light beam that has passed through the second dichroic mirror, the relay system reversing the third color light beam; and a relay system disposed between the fourth dichroic mirror and the fourth light modulation element that modulates the first color light beam that has passed through the fourth dichroic mirror, the relay system reversing the first color light beam. At the same time, the first color combining system combines the image light beams corresponding to the first to third color light beams by reflecting the image light beam corresponding to the first color light beam that has been modulated by the first light modulation element and the image light beam corresponding to the third color light beam that has been modulated by the third light modulation element and transmitting the image light beam corresponding to the second color light beam that has been modulated by the second light modulation element, and the second color combining system combines the image light beams corresponding to the first to third color light beams by reflecting the image light beam corresponding to the first color light beam that has been modulated by the fourth light modulation element and the image light beam corresponding to the third color light beam that has been modulated by the sixth light modulation element and transmitting the image light beam corresponding to the second color light beam that has been modulated by the fifth light modulation element.

By employing such a configuration, the image light beam corresponding to the third color light beam from the first image formation unit and the image light beam corresponding to the third color light beam from the second image formation unit can be projected in such a way that these image light beams are reversed from each other in the right-left direction on the projection surface, and the image light beam corresponding to the first color light beam from the first image formation unit and the image light beam corresponding to the first color light beam from the second image formation unit can be projected in such a way that these image light beams are reversed from each other in the right-left direction on the projection surface.

(5) In the projector according to (2), it is preferable that the first and second dichroic mirrors are configured in such a way that the first dichroic mirror reflects the first color light and transmits the second and third color light and the second dichroic mirror reflects the second color light and transmits the third color light, and the third and fourth dichroic mirrors are configured in such a way that the third dichroic mirror reflects the third color light and transmits the first and second color light and the fourth dichroic mirror reflects the first color light and transmits the second color light. At the same time, the third color light beam traveling along the illumination optical axis in the second dichroic mirror and passing through the front area thereof and the third color light beam traveling along the illumination optical axis in the third dichroic mirror and reflected off the front area thereof are projected in such a way that these third color light beams are reversed from each other in the right-left direction on the projection surface, and the second color light beam traveling along the illumination optical axis in the second dichroic mirror and reflected off the front area thereof and the second color light beam traveling along the illumination optical axis in the fourth dichroic mirror and passing through the front area thereof are projected in such a way that these second color light beams are reversed from each other in the right-left direction on the projection surface.

That is, for each of the second and third light beams among the first to third color light beams, the image light beams corresponding to the same color light beams are reversed from each other in the right-left direction on the projection surface. By employing such a configuration provided that, for example, the second color is green and the third color is blue, for the green and blue color light beams, it is possible to prevent the generation of unevenness in the amount of light in the right-left direction (horizontal direction) on the projection surface. By thus preventing the generation of unevenness in the amount of light in the right-left direction (horizontal direction) on the projection surface, for example, for the two green and blue color light beams among the three red, green, and blue color light beams, the unevenness in the amount of light on the screen is improved as compared to that in the projector of related art (see FIG. 8). As a result, it is possible to prevent degradation in image quality of the projected image.

(6) In the projector according to (5), it is preferable that the projector further includes a relay system disposed between the second dichroic mirror and the third light modulation element that modulates the third color light beam that has passed through the second dichroic mirror, the relay system reversing the third color light beam; and a relay system disposed between the fourth dichroic mirror and the fifth light modulation element that modulates the second color light beam that has passed through the fourth dichroic mirror, the relay system reversing the second color light beam. At the same time, the first color combining system combines the image light beams corresponding to the first to third color light beams by reflecting the image light beam corresponding to the first color light beam that has been modulated by the first light modulation element and the image light beam corresponding to the third color light beam that has been modulated by the third light modulation element and transmitting the image light beam corresponding to the second color light beam that has been modulated by the second light modulation element, and the second color combining system combines the image light beams corresponding to the first to third color light beams by reflecting the image light beam corresponding to the second color light beam that has been modulated by the fifth light modulation element and the image light beam corresponding to the third color light beam that has been modulated by the sixth light modulation element and transmitting the image light beam corresponding to the first color light beam that has been modulated by the fourth light modulation element.

By employing such a configuration, the image light beam corresponding to the third color light beam from the first image formation unit and the image light beam corresponding to the third color light beam from the second image formation unit can be projected in such a way that these image light beams are reversed from each other in the right-left direction on the projection surface, and the image light beam corresponding to the second color light beam from the first image formation unit and the image light beam corresponding to the second color light beam from the second image formation unit can be projected in such a way that these image light beams are reversed from each other in the right-left direction on the projection surface.

(7) In the projector according to any of (1) to (6), it is preferable that the optical elements in the first and second image formation units are disposed in the same plane.

By thus disposing the first and second image formation units, the optical elements in the projector can be efficiently disposed. As a result, the whole optical system in the projector can be a compact one.

(8) In the projector according to any of (1) to (7), it is preferable that the projector further includes a double-sided reflection mirror as a reflection mirror that directs the color light beams reflected off the first and third dichroic mirrors to the corresponding light modulation elements among the first to six light modulation elements, and the first and second image formation units share the double-sided reflection mirror.

By employing a configuration in which the first and second image formation units share the double-sided reflection mirror, the configuration of the optical system can be simplified without increasing the number of parts in the optical system.

(9) In the projector according to (8), it is preferable that the projector further includes an optical axis adjuster that adjusts the optical axes of the color light beams reflected off the double-sided reflection mirror.

By providing such an optical axis adjuster, even when the first and second image formation units share the double-sided reflection mirror, the optical axes of the color light beams reflected off the reflection surfaces of the double-sided reflection mirror are appropriately positioned in the optical systems of the first and second image formation units. "Appropriately positioning the optical axes of the color light beams reflected off the reflection surfaces of the double-sided reflection mirror in the optical systems of the first and second image formation units" means that, for example, when the color light beams are combined in the first color combining system in the first image formation unit and the second color combining system in the second image formation unit, the optical axes of the combined color light beams coincide with one another in each of the color combining systems.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Embodiments of the invention will be described below.

First Embodiment

Figure 1:
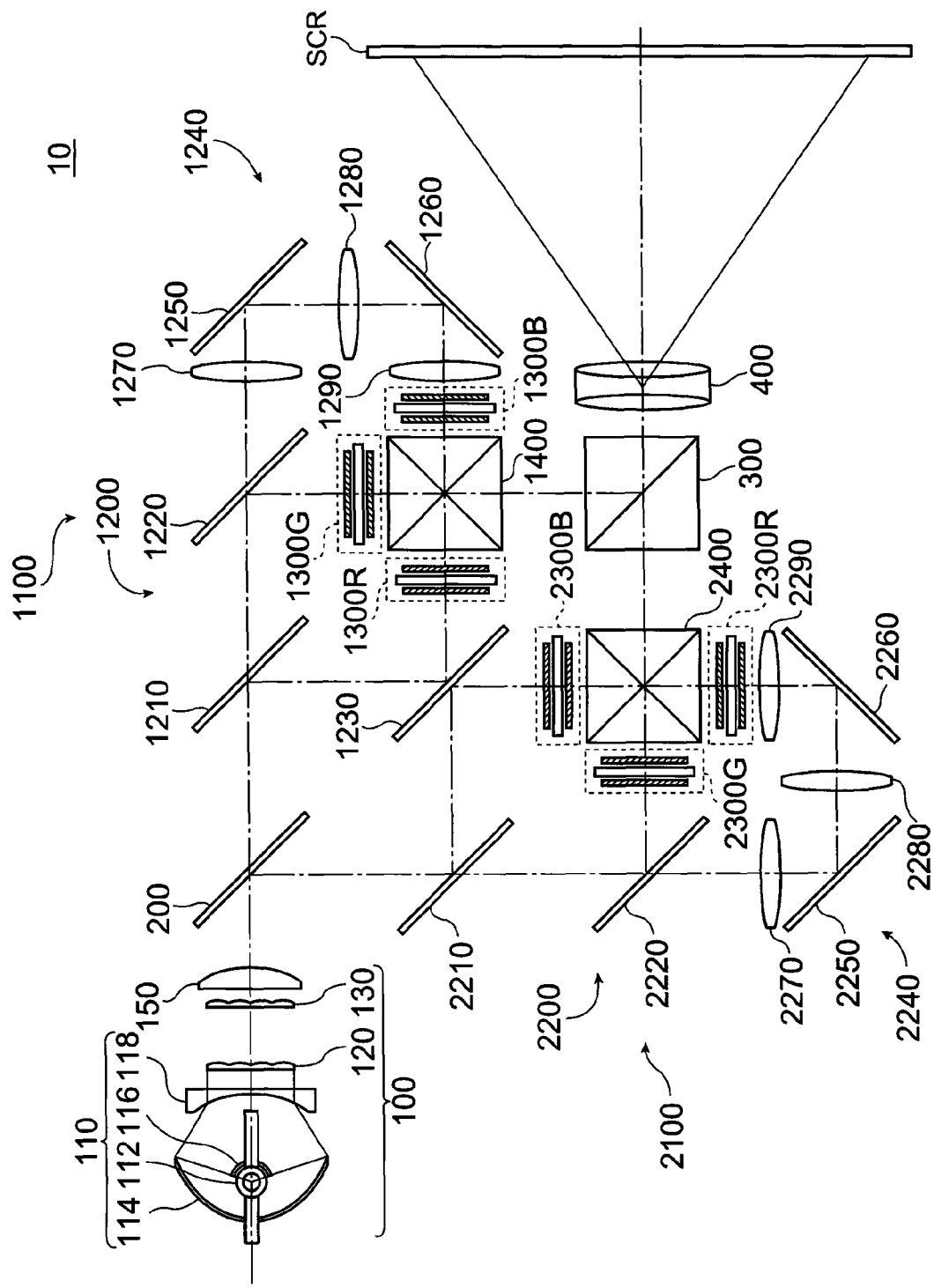
FIG. 1 diagrammatically shows the optical system of a projector 10 according to a first embodiment.

FIG. 1 diagrammatically shows the optical system of a projector 10 according to a first embodiment. The projector 10 according to the first embodiment includes, as shown in FIG. 1, an illuminator 100 that emits light containing red light (first color light), green light (second color light), and blue light (third color light), a polarization separation mirror 200 as a polarization separation system, a first image formation unit 1100 as first image formation means that outputs first image light, a second image formation unit 2100 as second image formation means that outputs second image light, a polarization combining prism 300 as a polarization combining system, and a projection system 400 that projects image light combined in the polarization combining prism 300.

The illuminator 100 includes a light source 110 that emits an illumination light flux toward the area to be illuminated, a concave lens 118 disposed on the side of the illuminator 110 that faces the area to be illuminated, a first lens array 120 formed of first lenslets that divide the illumination light flux that has exited from the concave lens 118 into a plurality of sub-light fluxes, a second lens array 130 formed of a plurality of second lenslets corresponding to the plurality of first lenslets in the first lens array 120, and a superimposing lens 150 that superimposes the sub-light fluxes that have exited from the second lens array 130 on the illuminated area.

The light source 110 includes an ellipsoidal reflector 114, an arc tube 112, the emission center of which is located in the vicinity of the first focal point of the ellipsoidal reflector 114, a sub-mirror 116 that reflects the light emitted from the arc tube 112 toward the area to be illuminated back toward the arc tube 112, and the concave lens 118 that outputs the convergent light from the ellipsoidal reflector 114 as substantially collimated light.

The polarization separation mirror 200 serves to separate the light from the illuminator 100 into light containing a first polarization component (p-polarized light, for example) and light containing a second polarization component (s-polarized light, for example).

The first image formation unit 1100 includes a first color separation system 1200 that separates the light containing the first polarization component separated by the polarization separation mirror 200 into red light, green light, and blue light, first to third light modulation elements 1300R to 1300B that modulate the color light beams separated by the first color separation system 1200, and a cross dichroic prism 1400 as a first color combining system that combines the red light, green light, and blue light modulated by the first to third light modulation elements 1300R to 1300B. The first image formation unit 1100 outputs image light containing the first polarization component (hereinafter referred to as first image light).

The first color separation system 1200 includes a first dichroic mirror 1210 that separates the light containing the first polarization component separated by the polarization separation mirror 200 into red light and other color light, a second dichroic mirror 1220 that separates the other color light separated by the first dichroic mirror 1210 into green light and blue light, a double-sided reflection mirror 1230, and a relay system 1240.

The thus configured first color separation system 1200 has a function of separating the light containing the first polarization component separated by the polarization separation mirror 200 into the three color light beams, which are red, green, and blue light beams, and guiding them to the first to third light modulation elements 1300R to 1300B.

The light containing the red light component reflected off the first dichroic mirror 1210 is reflected off the double-sided reflection mirror 1230 and then incident on the image formation area of the liquid crystal panel of the first light modulation element 1300R. The light containing the green light component, which, along with the light containing the blue light component, has passed through the first dichroic mirror 1210, is reflected off the second dichroic mirror 1220 and then incident on the image formation area of the liquid crystal panel of the second light modulation element 1300G. On the other hand, the light containing the blue light component passes through the second dichroic mirror 1220 and enters the relay system 1240.

The relay system 1240 includes a light incident-side lens 1270, a light incident-side reflection mirror 1250, a relay lens 1280, a light exiting-side reflection mirror 1260, and a light exiting-side lens 1290. The relay system 1240 serves to guide the light containing the blue light component that has passed through the second dichroic mirror 1220 to the liquid crystal panel of the third light modulation element 1300B. The blue light that has passed through the second dichroic mirror 1220 passes through the relay system 1240, where the image is horizontally reversed, and is incident on the image formation area of the liquid crystal panel of the third light modulation element 1300B.

The first to third light modulation elements 1300R to 1300B, which are illuminated by means of the illuminator 100, modulate the illumination light flux according to image information. Each of the first to third light modulation elements 1300R to 1300B includes a liquid crystal panel, a light incident-side polarizer plate disposed on the light incident-side of the liquid crystal panel, and a light exiting-side polarizer plate disposed on the light exiting-side of the liquid crystal panel.

The liquid crystal panel seals and encapsulates liquid crystal molecules, electro-optic material, between a pair of transparent glass substrates. For example, a polysilicon TFT is used as a switching element to modulate, according to the provided image information, the polarization direction of the one type of linearly polarized light that has exited from the light incident-side polarizer plate. The light incident-side polarizer plate, the liquid crystal panel, and the light exiting-side polarizer plate modulate the incident light of each color.

The cross dichroic prism 1400 is an optical element that combines the optical images modulated for the respective color light beams that have exited from the light exiting-side polarizer plates, and forms a color image.

The second image formation unit 2100 includes a second color separation system 2200 that separates the light containing the second polarization component separated by the polarization separation mirror 200 into red light, green light, and blue light, fourth to sixth light modulation elements 2300R to 2300B that modulate the color light beams separated by the second color separation system 2200, and a cross dichroic prism 2400 as a second color combining system that combines the red light, green light, and blue light modulated by the fourth to sixth light modulation elements 2300R to 2300B. The second image formation unit 2100 outputs image light containing the second polarization component (hereinafter referred to as second image light).

The second color separation system 2200 includes a third dichroic mirror 2210 that separates the light containing the second polarization component separated by the polarization separation mirror 200 into blue light and other color light, a fourth dichroic mirror 2220 that separates the other color light separated by the third dichroic mirror 2210 into green light and red light, the double-sided reflection mirror 1230, and a relay system 2240.

The thus configured second color separation system 2200 has a function of separating the light containing the second polarization component separated by the polarization separation mirror 200 into the three color light beams, which are red, green, and blue light beams, and guiding them to the fourth to sixth light modulation elements 2300R to 2300B.

The light containing the blue light component reflected off the third dichroic mirror 2210 is reflected off the reflection mirror 1230 and then incident on the image formation area of the liquid crystal panel of the sixth light modulation element 2300B. The light containing the green light component, which, along with the light containing the red light component, has passed through the third dichroic mirror 2210, is reflected off the fourth dichroic mirror 2220 and then incident on the image formation area of the liquid crystal panel of the fifth light modulation element 2300G. On the other hand, the light containing the red light component passes through the fourth dichroic mirror 2220 and enters the relay system 2240.

The relay system 2240 includes a light incident-side lens 2270, a light incident-side reflection mirror 2250, a relay lens 2280, a light exiting-side reflection mirror 2260, and a light exiting-side lens 2290. The relay system 2240 serves to guide the light containing the red light component that has passed through the fourth dichroic mirror 2220 to the liquid crystal panel of the fourth light modulation element 2300R. The red light that has passed through the fourth dichroic mirror 2220 passes through the relay system 2240, where the image is horizontally reversed, and is incident on the image formation area of the liquid crystal panel of the fourth light modulation element 2300R.

In the projector 10 according to the first embodiment, the double-sided reflection mirror 1230 is shared by the first image formation unit 1100 and the second image formation unit 2100. The first image formation unit 1100 uses the double-sided reflection mirror 1230 as the reflection mirror for directing the red light component to the first light modulation element 1300R, and the second image formation unit 2100 uses the double-sided reflection mirror 1230 as the reflection mirror for directing the blue light component to the sixth light modulation element 2300B.

The fourth to sixth light modulation elements 2300R to 2300B and the cross dichroic prism 2400 are configured in the same manner as the first to third light modulation elements 1300R to 1300B and the cross dichroic prism 1400, and hence will not be described in detail.

The polarization combining prism 300 has a polarization combining plane where the light containing the first polarization component is combined with the light containing the second polarization component. The polarization combining prism 300 combines the first image light outputted from the first image formation unit 1100 with the second image light outputted from the second image formation unit 2100, and directs the combined light toward the projection system 400.

The color image outputted from the polarization combining prism 300 is enlarged and projected through the projection system 400, and forms a large-screen image on a screen SCR.

Figure 8:
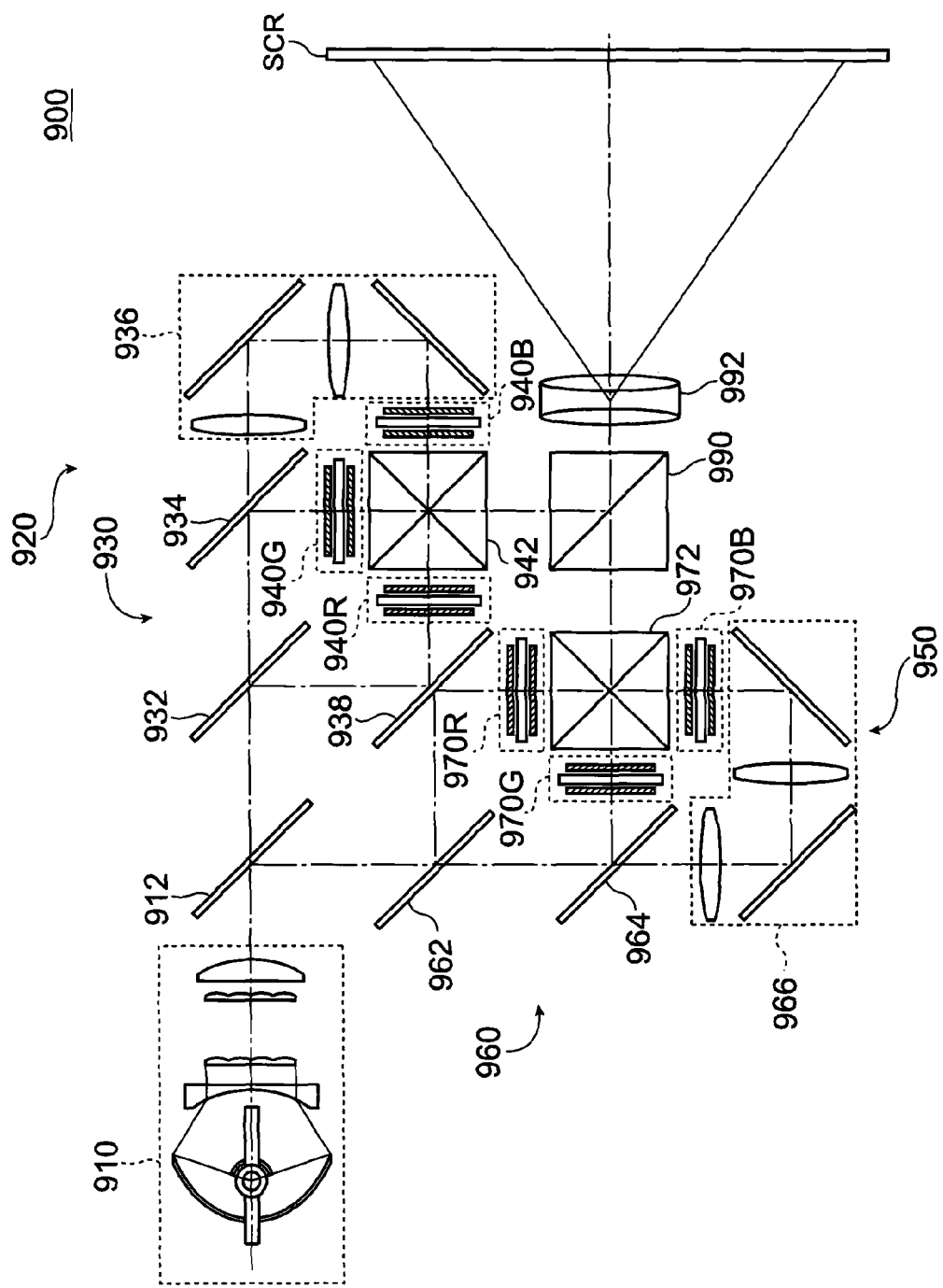
FIG. 8 diagrammatically shows the optical system of a projector 900 of related art.
Figure 9A:
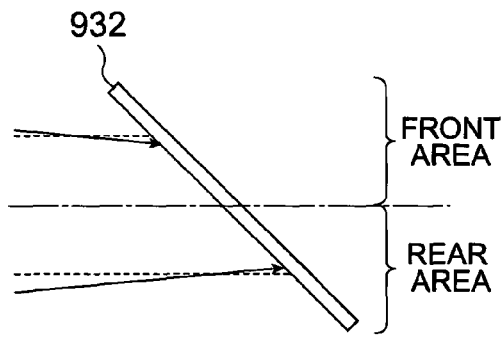
FIGS. 9A and 9B explain a problem of the projector 900 of related art.
Figure 9B:
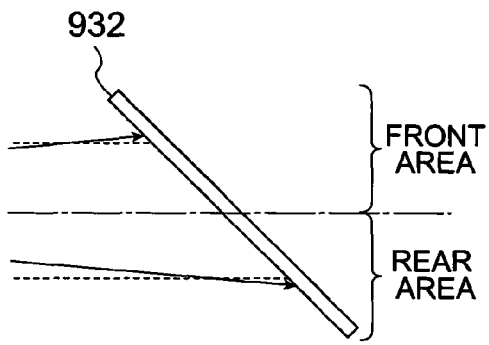
Figure 10:
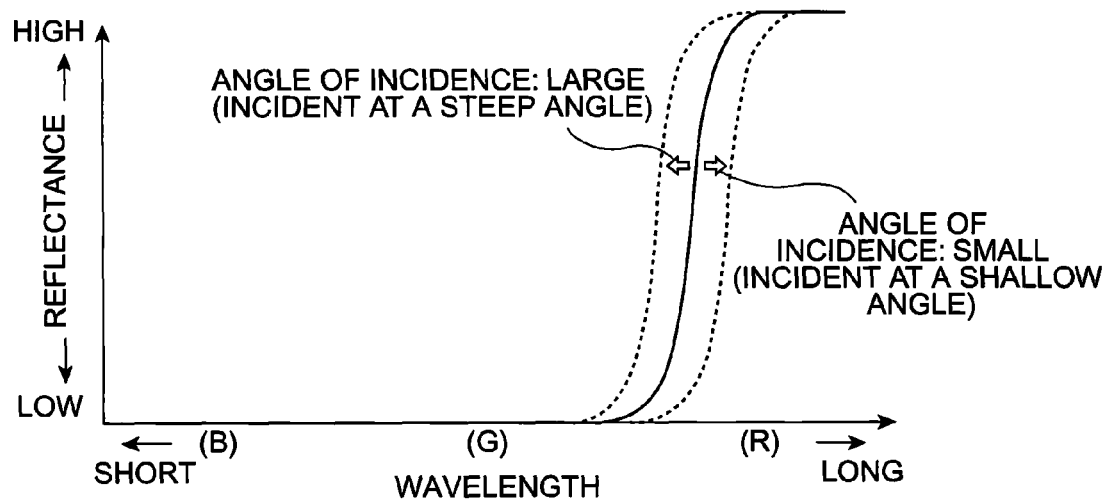
FIG. 10 explains the spectral characteristics of a first dichroic mirror 932.
Figure 11:
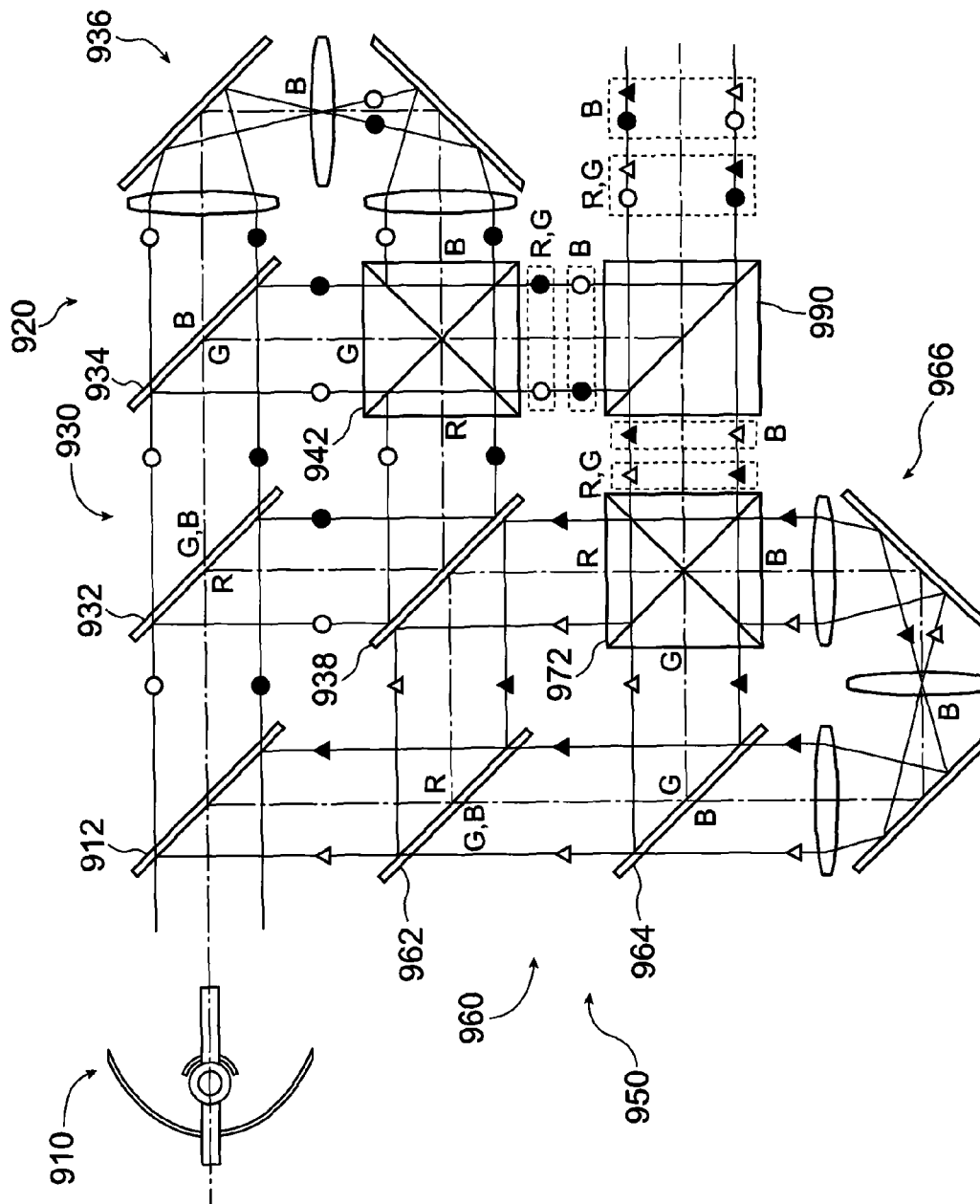
FIG. 11 diagrammatically shows the light path of the light traveling in the projector 900 of related art.

The projector 10 according to the first embodiment is thus configured and the optical elements are disposed as described above. Although the projector 10 according to the first embodiment shown in FIG. 1 seems to have, at first glance, the same configuration as that of the projector of related art shown in FIG. 8, the optical system of the projector 10 is configured in such a way that, for each of the red and blue light, the image light beams corresponding to the same color light beams outputted from the first and second image formation unit 1100 and 2100 are reversed from each other in the right-left direction on the projection surface.

That is, in the projector 10 according to the first embodiment, the first dichroic mirror 1210 reflects the red light and transmits the green and blue light, and the second dichroic mirror 1220 reflects the green light and transmits the blue light in the first image formation unit 1100, whereas the third dichroic mirror 2210 reflects the blue light and transmits the red and green light, and the fourth dichroic mirror 2220 reflects the green light and transmits the red light in the second image formation unit 2100.

Since the projector 10 according to the first embodiment is thus configured, for each of the red and blue light, the image light beams corresponding to the same color light beams outputted from the first and second image formation units 1100 and 2100 are reversed from each other in the right-left direction on the projection surface. This situation will be described below in detail with reference to FIG. 2.

Figure 2:
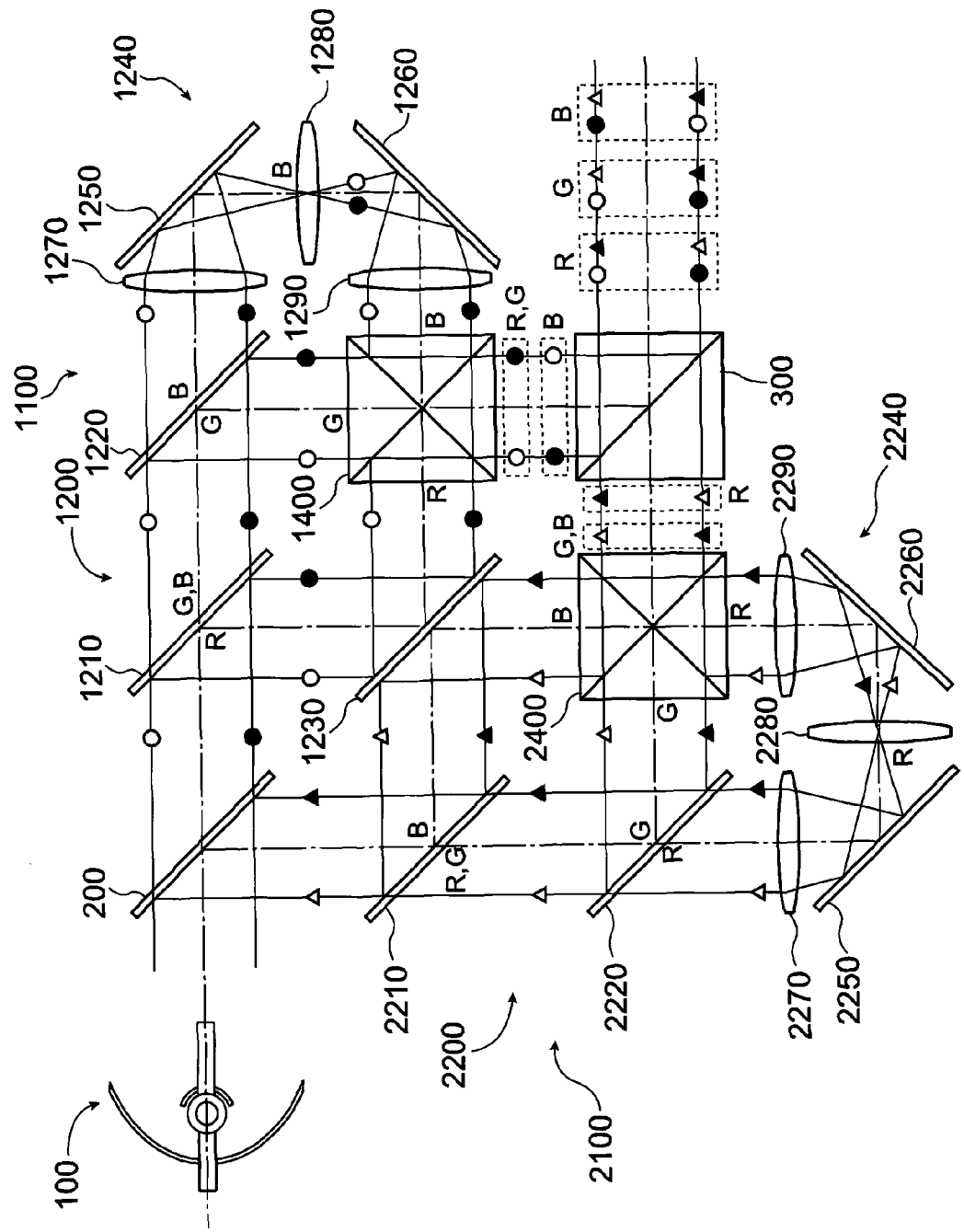
FIG. 2 diagrammatically shows the light path of the light traveling in the projector 10 according to the first embodiment.

FIG. 2 diagrammatically shows the light path of the light traveling in the projector 10 according to the first embodiment. In FIG. 2, the light path of the light traveling along the system optical axis of the first dichroic mirror 1210 and incident on the front area thereof is indicated by the open circles. The light path of the light traveling along the system optical axis of the first dichroic mirror 1210 and incident on the rear area thereof is indicated by the filled circles. The light path of the light traveling along the system optical axis of the third dichroic mirror 2210 and incident on the front area thereof is indicated by the open triangles. The light path of the light traveling along the system optical axis of the third dichroic mirror 2210 and incident on the rear area thereof is indicated by the filled triangles.

For clarity, FIG. 2 does not show the first to sixth light modulation elements 1300R to 1300B and 2300R to 2300B and the projection system 400.

In the projector 10 according to the first embodiment, as shown in FIG. 2, the red light reflected off the front area of the first dichroic mirror 1210 (see the light path indicated by the open circles) is superimposed with the red light passing through the rear area of the fourth dichroic mirror 2220 (see the light path indicated by the filled triangles), and the red light reflected off the rear area of the first dichroic mirror 1210 (see the light path indicated by the filled circles) is superimposed with the red light passing through the front area of the fourth dichroic mirror 2220 (see the light path indicated by the open triangles).

That is, among the first polarization components separated by the polarization separation mirror 200, the red light reflected off the front area of the first dichroic mirror 1210 (see the light path indicated by the open circles) is reflected of the double-sided reflection mirror 1230, is incident on the image formation area of the liquid crystal panel of the first light modulation element 1300R (not shown in FIG. 2), is reflected off the cross dichroic prism 1400, and exits through the polarization combining prism 300 (see the light path indicated by the open circles).

The red light reflected off the rear area of the first dichroic mirror 1210 (see the light path indicated by the filled circles) is reflected of the double-sided reflection mirror 1230, is incident on the image formation area of the liquid crystal panel of the first light modulation element 1300R (not shown in FIG. 2), is reflected off the cross dichroic prism 1400, and exits through the polarization combining prism 300 (see the light path indicated by the filled circles).

On the other hand, among the second polarization components separated by the polarization separation mirror 200, the red light passing through the front areas of the third dichroic mirror 2210 and the fourth dichroic mirror 2220 (see the light path indicated by the open triangles) passes through the relay system 2240, where the image is horizontally reversed, is incident on the image formation area of the liquid crystal panel of the fourth light modulation element 2300R (not shown in FIG. 2) (see the light path indicated by the open triangles), is reflected off the cross dichroic prism 2400, and exits through the polarization combining prism 300 (see the light path indicated by the open triangles).

The red light passing through the rear areas of the third dichroic mirror 2210 and the fourth dichroic mirror 2220 (see the light path indicated by the filled triangles) passes through the relay system 2240, where the image is horizontally reversed, is incident on the image formation area of the liquid crystal panel of the fourth light modulation element 2300R (not shown in FIG. 2) (see the light path indicated by the filled triangles), is reflected off the cross dichroic prism 2400, and exits through the polarization combining prism 300 (see the light path indicated by the filled triangles).

In this way, the red light reflected off the front area of the first dichroic mirror 1210 (see the light path indicated by the open circles) is superimposed with the red light passing through the rear area of the fourth dichroic mirror 2220 (see the light path indicated by the filled triangles), and the red light reflected off the rear area of the first dichroic mirror 1210 (see the light path indicated by the filled circles) is superimposed with the red light passing through the front area of the fourth dichroic mirror 2220 (see the light path indicated by the open triangles).

Therefore, the difference in the amount of light (unevenness in the amount of light) generated between the red light reflected off the front area of the first dichroic mirror 1210 and the red light reflected off the rear area thereof cancels the difference in the amount of light (unevenness in the amount of light) generated between the red light passing through the front area of the fourth dichroic mirror 2220 and the red light passing through the rear area thereof.

As a result, among the image light projected onto the screen SCR, the red light will not present unevenness in the amount of light in the right-left direction (horizontal direction).

Next, a description will be made of the blue light. Among the first polarization components separated by the polarization separation mirror 200, the blue light passing through the front areas of the first dichroic mirror 1210 and the second dichroic mirror 1220 (see the light path indicated by the open circles) passes through the relay system 1240, where the image is horizontally reversed, is incident on the image formation area of the liquid crystal panel of the third light modulation element 1300B (not shown in FIG. 2) (see the light path indicated by the open circles), is reflected off the cross dichroic prism 1400, and exits through the polarization combining prism 300 (see the light path indicated by the open circles).

The blue light passing through the rear areas of the first dichroic mirror 1210 and the second dichroic mirror 1220 (see the light path indicated by the filled circles) passes through the relay system 1240, where the image is horizontally reversed, is incident on the image formation area of the liquid crystal panel of the third light modulation element 1300B (not shown in FIG. 2) (see the light path indicated by the filled circles), is reflected off the cross dichroic prism 1400, and exits through the polarization combining prism 300 (see the light path indicated by the filled circles).

On the other hand, among the second polarization components separated by the polarization separation mirror 200, the blue light reflected off the front area of the third dichroic mirror 2210 (see the light path indicated by the open triangles) is reflected off the double-sided reflection mirror 1230, is incident on the image formation area of the liquid crystal panel of the sixth light modulation element 2300B (not shown in FIG. 2), is reflected off the cross dichroic prism 2400, and exits through the polarization combining prism 300 (see the light path indicated by the open triangles).

The blue light reflected off the rear area of the third dichroic mirror 2210 (see the light path indicated by the filled triangles) is reflected off the double-sided reflection mirror 1230, is incident on the image formation area of the liquid crystal panel of the sixth light modulation element 2300B (not shown in FIG. 2), is reflected off the cross dichroic prism 2400, and exits through the polarization combining prism 300 (see the light path indicated by the filled triangles).

In this way, the blue light passing through the front area of the second dichroic mirror 1220 (see the light path indicated by the open circles) is superimposed with the blue light reflected off the rear area of the third dichroic mirror 2210 (see the light path indicated by the filled triangles), and the blue light passing through the rear area of the second dichroic mirror 1220 (see the light path indicated by the filled circles)

is superimposed with the blue light reflected off the front area of the third dichroic mirror 2210 (see the light path indicated by the open triangles).

Therefore, the difference in the amount of light (unevenness in the amount of light) generated between the blue light passing through the front area of the second dichroic mirror 1220 and the blue light passing through the rear area thereof cancels the difference in the amount of light (unevenness in the amount of light) generated between the blue light reflected off the front area of the third dichroic mirror 2210 and the blue light reflected off the rear area thereof.

As a result, among the image light projected onto the screen SCR, the blue light will not present unevenness in the amount of light in the right-left direction (horizontal direction).

For the green light, the light reflected off the front area of the second dichroic mirror 1220 (see the light path indicated by the open circles) is superimposed with the light reflected off the front area of the fourth dichroic mirror 2220 (see the light path indicated by the open triangles), and the light reflected off the rear area of the second dichroic mirror 1220 (see the light path indicated by the filled circles) is superimposed with the light reflected off the rear area of the fourth dichroic mirror 2220 (see the light path indicated by the filled triangles). This situation is similar to that in the projector of related art shown in FIG. 8.

In the projector 10 according to the first embodiment, for each of the red and blue light, the image light beams corresponding to the same color light beams outputted from the first and second image formation units 1100 and 2100 are reversed from each other in the right-left direction on the projection surface. Therefore, among the red, green, and blue light, the red and blue light will not present unevenness in the amount of light in the right-left direction (horizontal direction) on the screen SCR. In this way, among the red, green, and blue light, since the red and blue light will not present unevenness in the amount of light, the unevenness in the amount of light on the screen SCR can be improved as compared to that in the projector of related art having the optical system shown in FIG. 8.

As described above, the projector 10 according to the first embodiment can prevent the unevenness in the amount of light on the screen SCR while the compact configuration of the optical system in the projector of related art is substantially maintained. At the same time, since the optical length of the illumination system can be maintained to the length comparable to that of the projector of related art, the projector 10 can be a light-efficient projector. Further, in the projector 10 according to the first embodiment, since the first image formation unit 1100 and the second image formation unit 2100 share the double-sided reflection mirror 1230, the configuration of the optical system can be simplified without increasing the number of parts in the optical system.

When the first image formation unit 1100 and the second image formation unit 2100 share the double-sided reflection mirror 1230, the optical axes of the color light beams reflected off the reflection surfaces of the double-sided reflection mirror 1230 need to be set in an appropriate manner in the optical systems of the first image formation unit 1100 and the second image formation unit 2100. Such a setting operation can be carried out by first setting the double-sided reflection mirror in such a way that the optical axis of the color light beam reflected off the double-sided reflection mirror is appropriately set in the optical system in the first image formation unit 1100, and then adjusting the elements (such as the third dichroic mirror, the fourth dichroic mirror, and the relay system) in the optical system in the second image formation unit 2100.

Second Embodiment

In the projector 10 according to the first embodiment, the optical system is configured in such a way that for each of the red and blue light, the image light beams corresponding to the same color light beams outputted from the first and second image formation units 1100 and 2100 are reversed from each other in the right-left direction on the projection surface. Alternatively, by carrying out the reverse projection in the right-left direction on the screen SCR described above for the green and the blue light, instead of the red and blue light, an advantage of preventing unevenness in the amount of light in the image projected on the screen SCR is provided.

Figure 3:
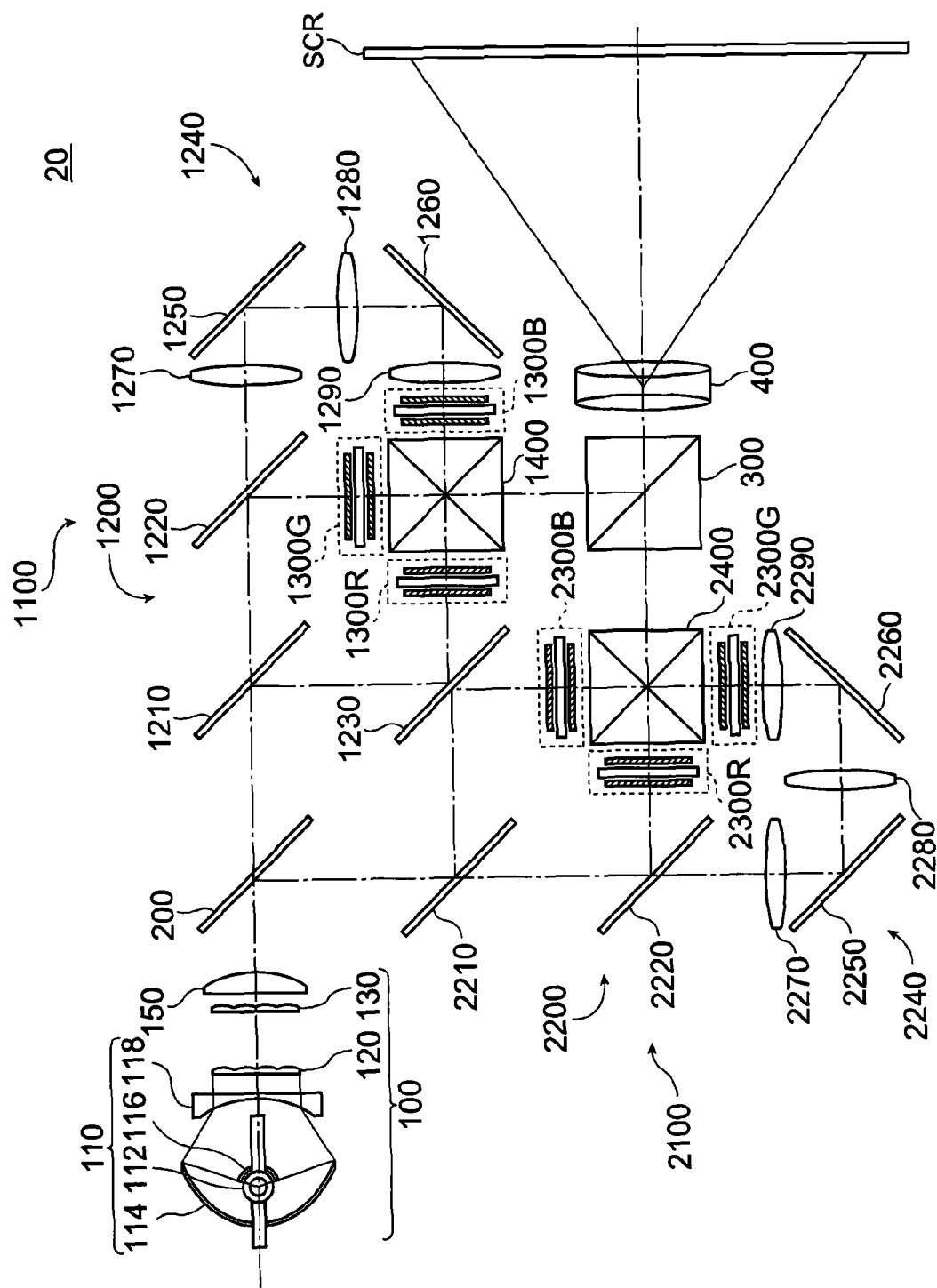
FIG. 3 diagrammatically shows the optical system of a projector 20 according to a second embodiment.

FIG. 3 diagrammatically shows the optical system of a projector 20 according to a second embodiment. As shown in FIG. 3, the projector 20 according to the second embodiment has a configuration similar to that shown in FIG. 1 except that the fourth dichroic mirror 2220 serves to reflect the red light and transmit the green light. The same components as those in FIG. 1 thus have the same reference characters.

Since the optical system of the projector 20 according to the second embodiment is thus configured, for each of the green and blue light, the image light beams corresponding to the same color light beams outputted from the first and second image formation units 1100 and 2100 can be reversed from each other in the right-left direction on the projection surface.

Figure 4:
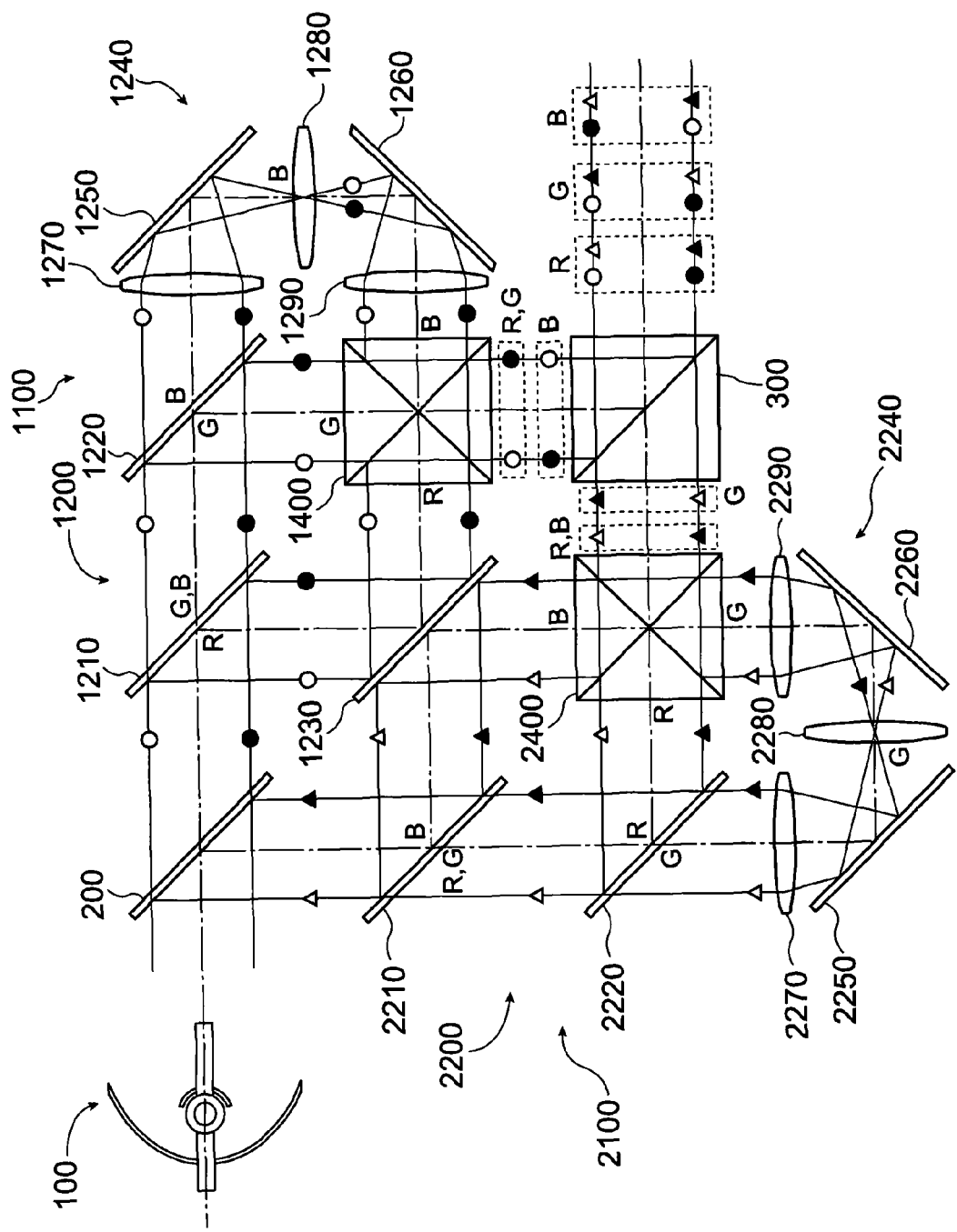
FIG. 4 diagrammatically shows the light path of the light traveling in the projector 20 according to the second embodiment.

FIG. 4 diagrammatically shows the light path of the light traveling in the projector 20 according to the second embodiment. In FIG. 4, as in FIG. 2, the light path of the light traveling along the system optical axis of the first dichroic mirror 1210 and incident on the front area thereof is indicated by the open circles. The light path of the light traveling along the system optical axis of the first dichroic mirror 1210 and incident on the rear area thereof is indicated by the filled circles. The light path of the light traveling along the system optical axis of the third dichroic mirror 2210 and incident on the front area thereof is indicated by the open triangles. The light path of the light traveling along the system optical axis of the third dichroic mirror 2210 and incident on the rear area thereof is indicated by the filled triangles. For clarity, FIG. 4 does not show the first to sixth light modulation elements 1300R to 1300B and 2300R to 2300B and the projection system 400.

In the projector 20 according to the second embodiment, as shown in FIG. 4, the green light reflected off the front area of the second dichroic mirror 1220 (see the light path indicated by the open circles) is superimposed with the green light passing through the rear area of the fourth dichroic mirror 2220 (see the light path indicated by the filled triangles), and the green light reflected off the rear area of the second dichroic mirror 1220 (see the light path indicated by the filled circles) is superimposed with the green light passing through the front area of the fourth dichroic mirror 2220 (see the light path indicated by the open triangles).

That is, the green light reflected off the front area of the second dichroic mirror 1220 (see the light path indicated by the open circles) is incident on the image formation area of the liquid crystal panel of the second light modulation element 1300G (not shown in FIG. 4), passes through the cross dichroic prism 1400, and exits through the polarization combining prism 300 (see the light path indicated by the open circles).

The green light reflected off the rear area of the second dichroic mirror 1220 (see the light path indicated by the filled circles) is incident on the image formation area of the liquid crystal panel of the second light modulation element 1300G (not shown in FIG. 4), passes through the cross dichroic prism 1400, and exits through the polarization combining prism 300 (see the light path indicated by the filled circles).

On the other hand, the green light passing through the front areas of the third dichroic mirror 2210 and the fourth dichroic mirror 2220 (see the light path indicated by the open triangles) passes through the relay system 2240, where the image is horizontally reversed, is incident on the image formation area of the liquid crystal panel of the fifth light modulation element 2300G (not shown in FIG. 4) (see the light path indicated by the open triangles), is reflected off the cross dichroic prism 2400, and exits through the polarization combining prism 300 (see the light path indicated by the open triangles).

The green light passing through the rear areas of the third dichroic mirror 2210 and the fourth dichroic mirror 2220 (see the light path indicated by the filled triangles) passes through the relay system 2240, where the image is horizontally reversed, is incident on the image formation area of the liquid crystal panel of the fifth light modulation element 2300G (not shown in FIG. 4) (see the light path indicated by the filled triangles), is reflected off the cross dichroic prism 2400, and exits through the polarization combining prism 300 (see the light path indicated by the filled triangles).

In this way, the green light reflected off the front area of the second dichroic mirror 1220 (see the light path indicated by the open circles) is superimposed with the green light passing through the rear area of the fourth dichroic mirror 2220 (see the light path indicated by the filled triangles), and the green light reflected off the rear area of the second dichroic mirror 1220 (see the light path indicated by the filled circles) is superimposed with the green light passing through the front area of the fourth dichroic mirror 2220 (see the light path indicated by the open triangles).

Therefore, the difference in the amount of light (unevenness in the amount of light) generated between the green light reflected off the front area of the second dichroic mirror 1220 and the green light reflected off the rear area thereof cancels the difference in the amount of light (unevenness in the amount of light) generated between the green light passing through the front area of the fourth dichroic mirror 2220 and the green light passing through the rear area thereof.

As a result, among the image light projected onto the screen SCR, the green light will not present unevenness in the amount of light in the right-left direction (horizontal direction).

The light path of the blue light in FIG. 4 is the same as that in FIG. 2. The blue light passing through the front area of the second dichroic mirror 1220 (see the light path indicated by the open circles) is superimposed with the blue light reflected off the rear area of the third dichroic mirror 2210 (see the light path indicated by the filled triangles), and the blue light passing through the rear area of the second dichroic mirror 1220 (see the light path indicated by the filled circles) is superimposed with the blue light reflected off the front area of the third dichroic mirror 2210 (see the light path indicated by the open triangles).

In the projector 20 according to the second embodiment, for each of the green and blue light, the image light beams corresponding to the same color light beams outputted from the first and second image formation units 1100 and 2100 are reversed from each other in the right-left direction on the projection surface. Therefore, among the red, green, and blue light, the green and blue light will not present unevenness in the amount of light in the right-left direction (horizontal direction) on the screen SCR. In this way, among the red, green, and blue light, since the green and blue light will not present unevenness in the amount of light, the unevenness in the amount of light on the screen SCR can also be improved as compared to that in the projector of related art having the optical system shown in FIG. 8.

Third Embodiment

As in the projector 10 according to the first embodiment and the projector 20 according to the second embodiment, when the first image formation unit 1100 and the second image formation unit 2100 share the double-sided reflection mirror 1230, it is preferable to provide an optical axis adjuster for appropriately positioning the optical axes of the color light beams reflected off the reflection surfaces of the double-sided reflection mirror 1230 in the optical systems of the first image formation unit 1100 and the second image formation unit 2100. A projector 30 according to a third embodiment will be described with reference to the case where the optical axis adjuster is a lens for adjusting the optical axis of color light (hereinafter referred to as optical axis adjustment lens).

Figure 5:
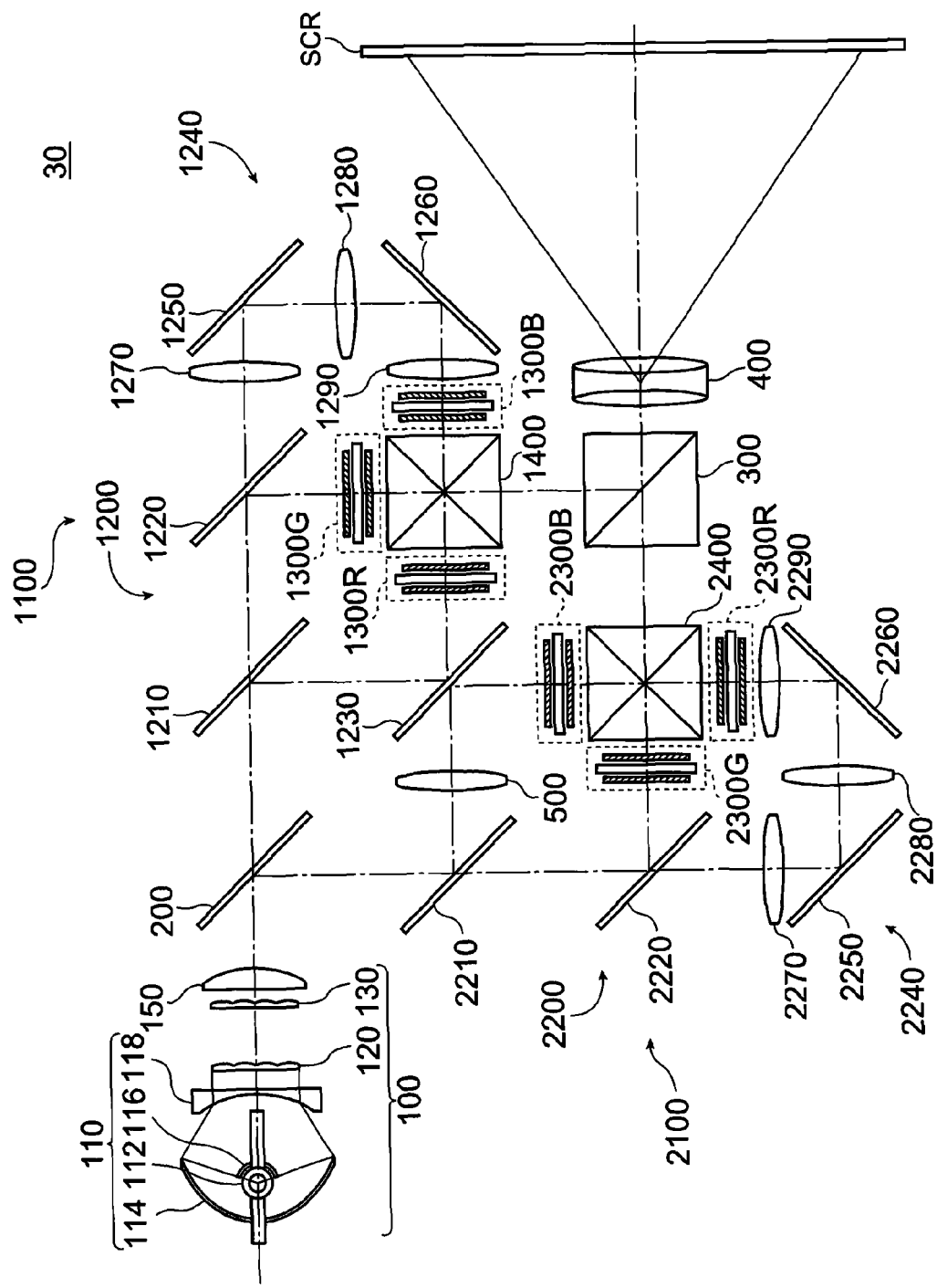
FIG. 5 diagrammatically shows the optical system of a projector 30 according to a third embodiment.

FIG. 5 diagrammatically shows the optical system of the projector 30 according to the third embodiment. While the optical system of the projector 30 according to the third embodiment has the same configuration as that of the projector 10 according to the first embodiment, the optical system of the projector 30 according to the third embodiment may have the same configuration as the optical system of the projector 20 according to the second embodiment.

As shown in FIG. 5, the projector 30 according to the third embodiment has a configuration similar to that shown in FIG. 1 except that an optical axis adjustment lens 500 is provided between the double-sided reflection mirror 1230 and the third dichroic mirror 2210. The same components as those in FIG. 1 thus have the same reference characters.

In the projector 30 according to the third embodiment, the double-sided reflection mirror 1230 is first set in such a way that in the first image formation unit 1100, the optical axis of the color light reflected off the double-sided reflection mirror 1230 is appropriately positioned in the optical system in the first image formation unit 1100, and then in the second image formation unit 2100, the optical axis adjustment lens 500 is used to appropriately position the optical axis of the color light reflected off the double-sided reflection mirror 1230 in the optical system in the second image formation unit 2100.

By employing such a configuration, the optical axis of the red light reflected off the first dichroic mirror 1210 can be appropriately positioned with respect to the cross dichroic prism 1400, and the optical axis of the blue light reflected off the third dichroic mirror 2210 can be appropriately positioned with respect to the cross dichroic prism 2400.

The lens (optical axis adjustment lens 500) is presented by way of example of the optical element for adjusting an optical axis. The lens can be, however, replaced with a glass plate having a predetermined thickness.

Fourth Embodiment

In a projector 40 according to a fourth embodiment, as the optical axis adjuster, the double-sided reflection mirror 1230 has reflection mirror surfaces, the angles of which are adjustable. As the optical system of the projector 40 according to the fourth embodiment as well, although the projector 10 according to the first embodiment is presented by way of example, the optical system of the projector 20 according to the second embodiment can be used as well.

Figure 6:
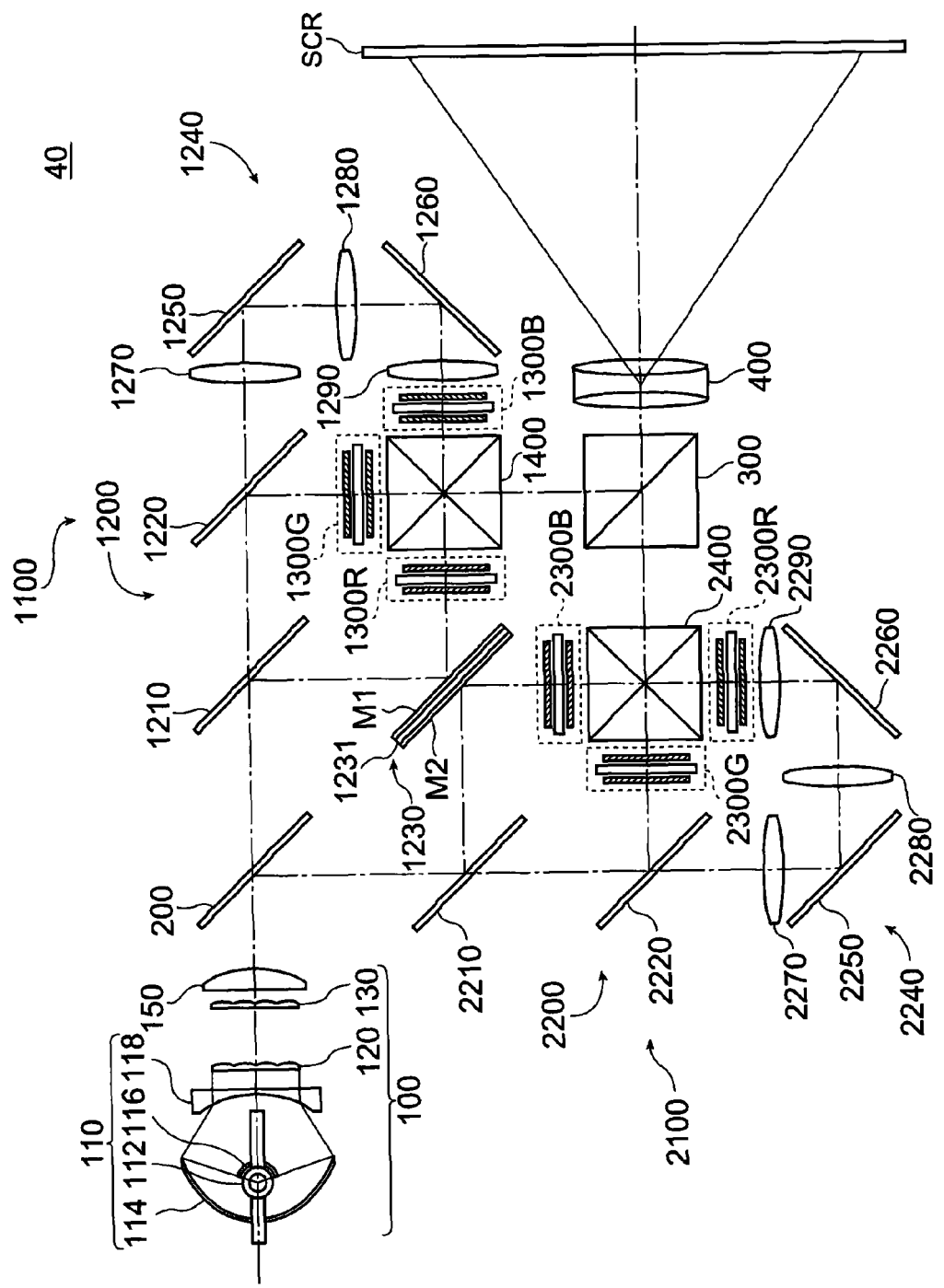
FIG. 6 diagrammatically shows the optical system of a projector 40 according to a fourth embodiment.

FIG. 6 diagrammatically shows the optical system of the projector 40 according to the fourth embodiment. The double-sided reflection mirror 1230 used in the projector 40 according to the fourth embodiment is configured in such a way that reflection mirrors M1 and M2 are attached to the two sides of a plate-like member 1231, respectively, and the angles of the reflection mirrors M1 and M2 can be changed within a predetermined range with respect to the plate-like member 1231.

Figure 7A:
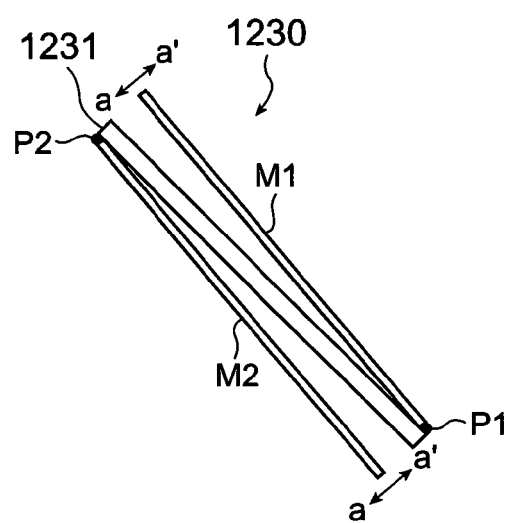
FIGS. 7A and 7B show examples of the configuration of a double-sided reflection mirror 1230 used in the projector 40 according to the fourth embodiment.
Figure 7B:
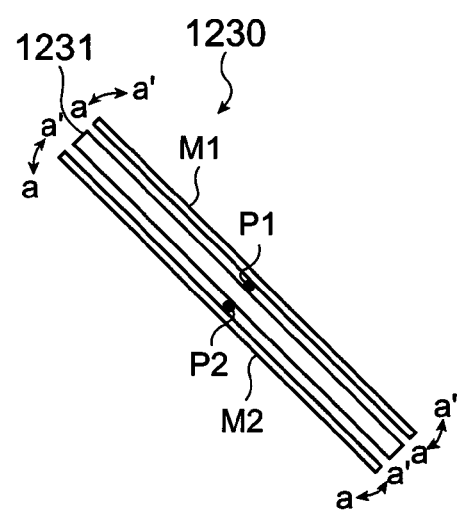

FIGS. 7A and 7B show examples of the configuration of the double-sided reflection mirror 1230 used in the projector 40 according to the fourth embodiment. FIG. 7A shows an example in which the reflection mirrors M1 and M2 are pivotable in the direction indicated by the arrows a-a' by using the ends of the reflection mirrors M1 and M2 as pivotal points P1 and P2. FIG. 7B shows an example in which the reflection mirrors M1 and M2 are pivotable in the direction indicated by the arrows a-a', like an seesaw, by using the central portions of the reflection mirrors M1 and M2 as pivotal points P1 and P2. To make the angles of the reflection mirrors M1 and M2 changeable within a predetermined range with respect to the plate-like member 1231, various other structures are conceivable.

By thus configuring the double-sided reflection mirror 1230, it is possible to make a fine adjustment to the angle of each of the reflection mirrors M1 and M2 within a predetermined range. Therefore, the optical axis of the red light reflected off the first dichroic mirror 1210 can be appropriately positioned with respect to the cross dichroic prism 1400, and the optical axis of the blue light reflected off the third dichroic mirror can be appropriately positioned with respect to the cross dichroic prism 2400. The double-sided reflection mirrors 1230 shown in FIGS. 7A and 7B can also be configured in such a way that a fine adjustment can be made to the angle of each of the reflection mirrors M1 and M2 within a predetermined range and the double-sided reflection mirror 1230 itself can be moved along the optical axes in two directions perpendicular to each other. In this way, the adjustment of the optical axes can be carried out more accurately in a simple manner.

In the examples described above, although the angles of both the reflection mirrors M1 and M2 are adjustable with respect to the plate-like member 1231, one of the reflection mirrors may be fixed and the angle of the other reflection mirror may be adjustable. For example, the reflection mirror M1 is fixed to the plate-like member 1231 so that the optical axis of the red light reflected off the first dichroic mirror 1210 can be appropriately positioned with respect to the cross dichroic prism 1400, and then, the angle of the reflection mirror M2 is set in such a way that the optical axis of the blue light reflected off the third dichroic mirror can be appropriately positioned with respect to the cross dichroic prism 2400. In this operation, the double-sided reflection mirror 1230 itself may be moved along the optical axes as required.

While the projector of the invention has been described with reference to the above embodiments, the invention is not limited thereto, but can be implemented in various aspects to the extent that they do not depart from the spirit of the invention. For example, the following variations are possible.

1. In the projector according to each of the above embodiments, although the description has been made of the case where unevenness in the amount of light is reduced by configuring the optical system as shown in each of the above embodiments, the unevenness in the amount of light may also be corrected by carrying out software-based image correction as well as by configuring the optical system as shown in any of the above embodiments.

2. In the projector according to each of the above embodiments, although the polarization separation mirror is used as the polarization separation system, the invention is not limited thereto. For example, a polarization separation prism (polarization beam splitter) can also be used. In the projector according to each of the above embodiments, although the polarization combining prism is used as the polarization combining system, the invention is not limited thereto. For example, a polarization combining element having a polarization combining plane formed on a substrate can also be used.

3. In the projector according to each of the above embodiments, although the illuminator having an arc tube is used as the illuminator, the invention is not limited thereto. For example, an LED (light emitting diode), an LD (semiconductor diode), or other solid state light sources can also be used as the illuminator.

4. In the projector according to each of the above embodiments, although the light modulation element including a transmissive liquid crystal panel is used as the light modulation element, the invention is not limited thereto. For example, a light modulation element including a reflective liquid crystal panel can also be used.

5. In the projector according to each of the above embodiments, although the light modulation element including a liquid crystal panel is used as the light modulation element, the invention is not limited thereto. For example, a micromirror-type light modulation element can also be used.

6. The invention is applicable to not only a front projection projector that projects a projection image from the observation side but also a rear projection projector that projects a projection image from the side opposite to the observation side.

In the projector according to each of the above embodiments, although one illuminator illuminates the first image formation unit 1100 and the second image formation unit 2100, illuminators (referred to as a first illuminator and a second illuminator) corresponding to the image formation units, respectively, may be provided. In this case, by configuring the first illuminator to emit light containing the first polarization component and the second illuminator to emit light containing the second polarization component, a projector having the same function as that of each of the above embodiments is provided.

The entire disclosure of Japanese Patent Application No. 2007-173750, filed Jul. 2, 2007, is expressly incorporated by reference herein.

What is claimed is:

1. A projector comprising:
a first image formation unit including a first color separation system having a first dichroic mirror that separates the light containing first to third color light components from an illuminator into a light beam containing one of the three color light components and a light beam containing the other two color light components and a second dichroic mirror that separates the light beam that has been separated by the first dichroic mirror and contains the other two color light components, first to third light modulation elements that modulate the first to third color light beams that have been separated by the first color separation system, and a first color combining system that combines image light beams corresponding to the first to third color light beams that have been modulated by the first to third light modulation elements;
a second image formation unit including a second color separation system having a third dichroic mirror that separates the light containing the first to third color light components from the illuminator into a light beam containing one of the three color light components and a light beam containing the other two color light components, and a fourth dichroic mirror that separates the light beam that has been separated by the third dichroic mirror and contains the other two color light components, fourth to sixth light modulation elements that modulate the first to third color light beams that have been separated by the second color separation system, and a second color combining system that combines image light beams corresponding to the first to third color light beams that have been modulated by the fourth to sixth light modulation elements;

a polarization combining system that combines the image light beam outputted from the first image formation unit and the image light beam outputted from the second image formation unit; and a projection system that projects the image light beam that has been combined in the polarization combining system, wherein for each of two color light beams among the first to third color light beams, the image light beams corresponding to the same color light beams outputted from the first and second image formation units are projected in such a way that the image light beams are reversed from each other in the right-left direction on a projection surface.

2. The projector according to claim 1,
wherein the first and second dichroic mirrors are configured in such a way that the first dichroic mirror separates the first color light from the second and third color light and the second dichroic mirror separates the second color light from the third color light, and the third and fourth dichroic mirrors are configured in such a way that the third dichroic mirror separates the third color light from the first and second color light and the fourth dichroic mirror separates the first color light from the second color light.

3. The projector according to claim 2,
wherein the first and second dichroic mirrors are configured in such a way that the first dichroic mirror reflects the first color light and transmits the second and third color light and the second dichroic mirror reflects the second color light and transmits the third color light,
the third and fourth dichroic mirrors are configured in such a way that the third dichroic mirror reflects the third color light and transmits the first and second color light and the fourth dichroic mirror reflects the second color light and transmits the first color light,
the first color light beam traveling along the illumination optical axis in the first dichroic mirror and reflected off the front area thereof and the first color light beam traveling along the illumination optical axis in the fourth dichroic mirror and passing through the front area thereof are projected in such a way that the first color light beams are reversed from each other in the right-left direction on the projection surface, and
the third color light beam traveling along the illumination optical axis in the second dichroic mirror and passing through the front area thereof and the third color light beam traveling along the illumination optical axis in the third dichroic mirror and reflected off the front area thereof are projected in such a way that the third color light beams are reversed from each other in the right-left direction on the projection surface.

4. The projector according to claim 3, further comprising:
a relay system disposed between the second dichroic mirror and the third light modulation element that modulates the third color light beam that has passed through the second dichroic mirror, the relay system reversing the third color light beam; and
a relay system disposed between the fourth dichroic mirror and the fourth light modulation element that modulates the first color light beam that has passed through the fourth dichroic mirror, the relay system reversing the first color light beam,
wherein the first color combining system combines the image light beams corresponding to the first to third color light beams by reflecting the image light beam corresponding to the first color light beam that has been modulated by the first light modulation element and the image light beam corresponding to the third color light beam that has been modulated by the third light modulation element and transmitting the image light beam corresponding to the second color light beam that has been modulated by the second light modulation element, and
the second color combining system combines the image light beams corresponding to the first to third color light beams by reflecting the image light beam corresponding to the first color light beam that has been modulated by the fourth light modulation element and the image light beam corresponding to the third color light beam that has been modulated by the sixth light modulation element and transmitting the image light beam corresponding to the second color light beam that has been modulated by the fifth light modulation element.

5. The projector according to claim 2,
wherein the first and second dichroic mirrors are configured in such a way that the first dichroic mirror reflects the first color light and transmits the second and third color light and the second dichroic mirror reflects the second color light and transmits the third color light,
the third and fourth dichroic mirrors are configured in such a way that the third dichroic mirror reflects the third color light and transmits the first and second color light and the fourth dichroic mirror reflects the first color light and transmits the second color light,
the third color light beam traveling along the illumination optical axis in the second dichroic mirror and passing through the front area thereof and the third color light beam traveling along the illumination optical axis in the third dichroic mirror and reflected off the front area thereof are projected in such a way that the third color light beams are reversed from each other in the right-left direction on the projection surface, and
the second color light beam traveling along the illumination optical axis in the second dichroic mirror and reflected off the front area thereof and the second color light beam traveling along the illumination optical axis in the fourth dichroic mirror and passing through the front area thereof are projected in such a way that the second color light beams are reversed from each other in the right-left direction on the projection surface.

6. The projector according to claim 5, further comprising:
a relay system disposed between the second dichroic mirror and the third light modulation element that modulates the third color light beam that has passed through the second dichroic mirror, the relay system reversing the third color light beam; and
a relay system disposed between the fourth dichroic mirror and the fifth light modulation element that modulates the second color light beam that has passed through the fourth dichroic mirror, the relay system reversing the second color light beam, wherein the first color combining system combines the image light beams corresponding to the first to third color light beams by reflecting the image light beam corresponding to the first color light beam that has been modulated by the first light modulation element and the image light beam corresponding to the third color light beam that has been modulated by the third light modulation element and transmitting the image light beam corresponding to the second color light beam that has been modulated by the second light modulation element, and the second color combining system combines the image light beams corresponding to the first to third color light beams by reflecting the image light beam corresponding to the second color light beam that has been modulated by the fifth light modulation element and the image light beam corresponding to the third color light beam that has been modulated by the sixth light modulation element and transmitting the image light beam corresponding to the first color light beam that has been modulated by the fourth light modulation element.

7. The projector according to claim 1,
wherein the optical elements in the first and second image formation units are disposed in the same plane.

8. The projector according to claim 1, further comprising:
a double-sided reflection mirror as a reflection mirror that directs the color light beams reflected off the first dichroic mirror to the corresponding light modulation elements among the first to third light modulation elements,
wherein the first and second image formation units share the double-sided reflection mirror.

9. The projector according to claim 8, further comprising:
an optical axis adjuster that adjusts the optical axes of the color light beams reflected off the double-sided reflection mirror.

* * * * *